United States Patent
Kawa

[19]

[11] Patent Number: 5,949,482
[45] Date of Patent: Sep. 7, 1999

[54] OPTIMIZATION PROCESSING FOR INTEGRATED CIRCUIT PHYSICAL DESIGN AUTOMATION SYSTEM USING OPTIMALLY SWITCHED COST FUNCTION COMPUTATIONS

[75] Inventor: Seiji Kawa, Kanagawa, Japan

[73] Assignee: Sony Corporation, Tokyo, Japan

[21] Appl. No.: 08/600,688

[22] Filed: Feb. 13, 1996

[30] Foreign Application Priority Data

Feb. 14, 1995 [JP] Japan ................... 7-025395

[51] Int. Cl.$^6$ ............. H04N 5/335; H04N 9/64; H04N 9/68; H04N 5/228
[52] U.S. Cl. .......... 348/256; 348/222; 348/273; 348/280; 348/645; 348/649; 358/520
[58] Field of Search .................. 348/207, 222, 348/223, 224, 234, 255, 256, 262, 265, 641, 645, 646, 649, 650, 651, 652, 658, 659, 273, 280; 358/518, 520; H04N 5/228, 9/73, 9/68, 5/335, 9/64

[56] References Cited

U.S. PATENT DOCUMENTS

| 5,181,105 | 1/1993 | Udagawa et al. | 358/520 |
| 5,357,279 | 10/1994 | Nakamura et al. | 348/207 |
| 5,436,673 | 7/1995 | Bachmann et al. | 348/645 |
| 5,446,504 | 8/1995 | Wada | 348/645 |
| 5,691,779 | 11/1997 | Yamashita et al. | 348/645 |

FOREIGN PATENT DOCUMENTS 6-276542  9/1994  Japan ................ H04N 9/69

Primary Examiner—Wendy Garber
Assistant Examiner—Ngoc-Yen Vu
Attorney, Agent, or Firm—Frommer Lawrence & Haug, LLP; William S. Frommer

[57] ABSTRACT

There is provided a signal processing apparatus for processing input three primary color signals, which is capable of providing natural color reproduction. Input color signals R to B are subjected to a matrix operation to obtain color difference signals (R-Y)0 and (B-Y)0. The color signals R to B are compressed by means of high luminance compression circuits 12R to 12B, respectively, and these output color signals R1, G1 and B1 are subjected to obtain a luminance signal Y1, color difference signals (R-Y)1 and (B-Y)1. The respective outputs obtained from the matrix operation are operated by means of look-up tables 43 to 45 and 52 to obtain color difference signals (R-Y)3 and (B-Y)3 for representing a color which has the same hue as a hue θ 0 of color represented by color signals R to B and a saturation same with the saturation r1 of color represented by color signals R1, G1 and B1. Then, the luminance signal Y1, color difference signals (R-Y)3 and (B-Y)3 are subjected to an inverse matrix operation to obtain output color signals Rn, Gn and Bn. The color signals thus obtained have no change in a hue and the saturation smaller than that of conventional ones even if high luminance compression processing is executed. Accordingly, a high luminance portion can be prevented from being too deeply colored.

10 Claims, 7 Drawing Sheets

5,949,482

1

OPTIMIZATION PROCESSING FOR INTEGRATED CIRCUIT PHYSICAL DESIGN AUTOMATION SYSTEM USING OPTIMALLY SWITCHED COST FUNCTION COMPUTATIONS

BACKGROUND OF THE INVENTION

1. Field of the Invention

The present invention relates to a signal processing apparatus and a video camera incorporating the same. In particular, the present invention relates to a signal processing apparatus and a video camera incorporating the same, which is capable of improving color reproduction by effecting operation processing with respect to compressed three primary color signals so that a hue is kept to the same hue of a color represented by input three primary color signals and so that a degree of saturation becomes smaller than a saturation of a color represented by three primary color signals obtained by compressing the input three primary color signals with the same compression ratio.

2. Description Of The Related Art

In general, there has been known a so-called three-sensor color video camera including CCD image sensors for respective red, green and blue colors to image a subject. Assuming that a video signal has a dynamic range of 100%, an image signal obtained from the CCD image sensor for each color usually has a dynamic range of about 600%, and linear characteristics ranging from a low level region to a high level region. However, in the video camera, the maximum output in a luminance signal is limited to a dynamic range of 110%; for this reason, image signals obtained from the aforesaid CCD image sensors are transmitted in a state that a signal component of the maximum output or more is cut from the image signals.

In the case where the image signal having linear characteristics is transmitted in a state that a signal component of the maximum output or more is cut from the image signal, and an pictorial image obtained from the image signal is displayed on a monitor screen, a phenomenon such that all of bright portions in the subject whitens appears. In order to prevent such a phenomenon from appearing, a video camera is generally provided with a high luminance compression apparatus.

FIG. 1 is a block diagram showing a configuration of a three sensor color video camera including a high luminance compression apparatus. As shown in FIG. 1, image signals outputted from CCD image sensors 1R, 1G and 1B for red, green and blue color images, that is, red, green and blue color signals R, G and B are individually amplified by means of pre-amplifiers 2R, 2G and 2B, and then, converted into digital signals by means of A/D converters 3R, 3G and 3B.

These color signals R, G and B, which are converted into digital signals by means of A/D converters 3R, 3G and 3B, are subjected to high luminance compression processing by means of a high luminance compression apparatus 4, and gamma-corrected by means of gamma correction circuits 5R, 5G and 5B. Moreover, these color signals are subjected to white and black clip processings by clip circuits 6R, 6G and 6B, and supplied to a matrix circuit 7.

In the matrix circuit 7, a matrix operation is executed to generate a luminance signal Y, color difference signal R-Y and color difference signal B-Y from color signals R, G and B. And then, the luminance signal Y and color difference signals R-Y and B-Y outputted from the matrix circuit 7 are supplied to an encoder 8, and formed as digital video data DV for a predetermined television system, e.g., a highvision system. The digital video data DV is led through an output terminal 9.

FIG. 2 shows a configuration of the conventional high luminance compression apparatus 4. In FIG. 2, color signals R, G and B supplied to input terminals 11R, 11G and 11B are supplied to high luminance compression circuits (knee circuits) 12R, 12G and 12B, respectively. These high luminance compression circuits 12R, 12G and 12B individually executes high luminance compression processing on the basis of input/output characteristics as shown in FIG. 3. Specifically, when an input video level exceeds a knee point, level compression processing is carried out with a predetermined compression ratio.

FIG. 4 shows a configuration of the respective high luminance compression circuits 12R, 12G and 12B. In FIG. 4, input image data x (respective color signals R, G and B in the high luminance compression circuits 12R, 12G and 12B) supplied to an input terminal 15 is supplied to each of a fixed terminal "a" of a change-over switch 16, a positive input terminal of a comparator 17 and a subtractor 18. Knee point data KP supplied to an input terminal 19 is supplied to each of a negative input terminal of the comparator 17, the subtractor 18 and an adder 20.

Knee slop data KS supplied to an input terminal 21 and required for carrying out compression processing is supplied to a multiplier 22, and is multiplied by data (x−KP) outputted from the subtractor 18. Data {(KS (x−KP)} outputted from the multiplier 22 is supplied to an adder 20, and is added together with knee point data KP supplied to the input terminal 19. Then, data {KS ·x+KP (1−KS)} outputted from the adder 20 is supplied to a fixed terminal "b" of the change-over switch 16.

An output signal from the comparator 17 becomes a low level "L" when the image data x is less than the knee point data KP; on the other hand, it becomes a high level "H" when the image data x is more than the knee point data KP. Thus, the output signal from the comparator 17 is supplied to the change-over switch 16 as a switching control signal. Specifically, the change-over switch 16 is connected to the fixed terminal "a" side when an output signal from the comparator 17 is a low level "L"; on the other hand, it is connected to the fixed terminal "b" side when an output signal from the comparator 17 is a high level "H".

The output data from the change-over switch 16 is led through an output terminal 23 as output image data xc (color signals Rn, Gn and Bn in the respective high luminance compression apparatus 12R, 12G and 12B). In this case, the output image data xc is equal to the input image data x when the input image data x is less than the knee point data KP; on the other hand, the input image data x is compressed with a predetermined ratio when the input image data x is more than the knee point data KP.

The high luminance compression apparatus 4 shown in FIG. 4 independently executes high luminance compression processing with respect to the respective color signals R, G and B. For this reason, in the case where a level of a certain color signal exceeds the knee point and is compressed, there is a problem in that a video level ratio of color signals Rn, Gn and Bn is different from that of color signals R, G and B, causing a deterioration in color reproduction.

For example, in the high luminance compression apparatus 4 shown in FIG. 4, color signals Rn, Gn and Bn change in accordance with a change in a brightness of subject. In this case, the brightness of subject can be subtly varied by adjusting an iris. In FIG. 5, a symbol $xc_{kP}$ shows a level of the respective color signals Rn, Gn and Bn when each level of color signals R, G and B becomes equal to the knee point.

In Japanese Patent Application No. H06-223008 which was unpublished as of the filing date of the present application, there is disclosed a high luminance compression apparatus as shown in FIG. 6. The above application is owned by the assignee of the present invention and is hereby incorporated by reference.

Referring now to FIG. 6, the high luminance compression apparatus proposed by the applicant of the above application No. H06-223008 will be described below. FIG. 6 shows an example of the high luminance compression apparatus 4 which is provided in an image signal path of the video camera (see FIG. 1). In FIG. 6, like reference numerals are used to designate like parts corresponding to FIG. 2.

In FIG. 6, color signals R, G and B supplied to input terminals 11R, 11G and 11B are individually supplied to a maximum value detection circuit 25 to detect a color signal having the maximum video level in the above color signals R, G and B. Then, the maximum value detection circuit 25 outputs a maximum value data xmax indicative of a level of the detected color signal having the maximum video level. The maximum value data xmax is supplied to each of a positive input terminal of a comparator 26 and an inverse converter circuit 27.

Knee point data KP supplied to an input terminal 19 is supplied to each of a negative input terminal of the comparator 26 and a multiplier 28. On the other hand, knee slope data KS supplied to an input terminal 21 and required for compression processing is supplied to each of a subtractor 29 and an adder 30. Data supplied to an input terminal 31 and indicative of "1" is supplied to the subtractor 29.

Data (1−KS) outputted from the subtractor 29 is supplied to the multiplier 28, and multiplied by the knee point data KP supplied to the input terminal 19. Data {KP·(1−KS)} outputted from the multiplier 28 is supplied to the multiplier 31, and multiplied by data 1/xmax outputted from the inverse converter circuit 27. Data {KP·(1−KS)/xmax} outputted from the multiplier 31 is supplied to the adder 30, and added to the knee slop data KS supplied to the input terminal 21. Thus, a compression ratio data {KP·(1−KS)/xmax+KS} with respect to the color signal having the maximum video level is obtained from the adder 30.

Also, color signals R, G and B supplied to the input terminals 11R, 11G and 11B are individually supplied to respective fixed terminals a of change-over switches 33R, 33G and 33B and respective multipliers 34R, 34G and 34B through delay circuits 32R, 32G and 32B for adjusting a time. These delay circuits 32R, 32G and 32B individually have a delay time equivalent to a time spent in an operation process required for obtaining a compression ratio data {KP·(1−KS)/xmax+KS} with respect to the foregoing color signal having the maximum video level.

In multipliers 34R, 34G and 34B, the respective color R, G and B are multiplied by the compression ratio data {KP·(1−KS)/xmax+KS} outputted from the adder 30. These color signals R, G and B, having a compression ratio data with respect to the color signal having the maximum video level outputted from multipliers 34R, 34G and 34B, which is multiplied, are individually supplied to each fixed terminal "b" of change-over switches 33R, 33G and 33B.

An output signal from the comparator 26 becomes a low level "L" when the maximum value data xmax is less than the knee point data; on the other hand, it becomes a high level "H" when the maximum value data xmax is more than the knee point data. The output signal from the comparator 26 is supplied to the respective change-over switches 33R, 33G and 33B as a switching control signal. Specifically, these change-over switches 33R, 33G and 33B are connected to the fixed terminal "a" side when the output signal of the comparator 26 is a low level "L", and connected to the fixed terminal "b" side when the output signal of the comparator 26 is a high level "H".

Respective output signals from these change-over switches 33R, 33G and 33B are led into each of output terminals 13R, 13G and 13B as color signals Rn, Gn and Bn which are subjected to high luminance compression processing. In this case, when a video level (maximum value data xmax) of the color signal having the maximum video level among color signals R, G and B supplied to input terminals 11R, 11G and 11B is less than the knee point data KP, these color signals Rn, Gn and Bn are equal to color signals R, G, and B, supplied to the input terminals 11R, 11G and 11B, respectively. On the other hand, when the video level of the color signal having the maximum video level among color signals R, G and B supplied to input terminals 11R, 11G and 11B is more than the knee point data KP, the compression ratio data {KP·(1−KS)/xmax+KS} with respect to the color signal having the maximum video level is multiplied by the respective color signals R, G and B supplied to input terminals 11R, 11G and 11B.

In the high luminance compression apparatus 4 shown in FIG. 6, if a video level of a certain color signal exceeds the knee point and is compressed, all of color signals R, G and B are compressed with a compression ratio of the color signal having the maximum video level, so that a change in hue can be prevented. Specifically, in the high luminance compression apparatus 4 shown in FIG. 6, color signals Rn, Gn and Bn vary in accordance with a change in a brightness of subject, as shown in a graph of FIG. 7; therefore, a video level ratio of the respective color signals Rn, Gn and Bn always becomes constant.

However, in the high luminance compression apparatus 4 shown in FIG. 6, a degree of saturation almost remains as data of these color signals when a compression processing is executed; for this reason, a hue in a high luminance portion of pictorial image is too deep, as the case may be, the pictorial image becomes unnatural. The reason why the aforesaid degree of saturation remains is described by using a color difference coordinate plane as shown in FIG. 8. If a color represented by color signals R, G and B supplied to the high luminance compression apparatus 4 of FIG. 6 is shown at a point $A_0$ ($r_0 \cos \theta_0$, $r_0 \sin \theta_0$) on the above coordinate plane, a color represented by color signals Rn, Gn and Bn outputted when a video level of a certain color signal exceeds the knee point and compressed is shown at a point $A_2$ ($r_2 \cos \theta_0$, $r_2 \sin \theta_0$) on the coordinate plane, and the hue remains as it is while a degree of saturation almost remaining. Incidentally, symbols $r_0$ and $r_2$ denote a degree of saturation, and $\theta_0$ denotes an angle with respect to the B-Y axis, that is, a hue.

OBJECT AND SUMMARY OF THE INVENTION

An object of the present invention is to improve color reproduction in high luminance compression processing.

To achieve the above object, the present invention provides a signal processing apparatus for processing input three primary color signals comprising: compression means for compressing signal level of portions of the input three primary color signals having signal level higher than a predetermined signal level with a predetermined compression ratio; first matrix means for converting compressed three primary color signals supplied from said compression means into a first luminance signal and first two color difference signals; saturation signal generating means for generating a saturation signal indicating degree of saturation of the compressed three primary color signals from the first two color difference signals; hue signal generating means for generating a hue signal indicating hue of the input three primary color signals; and color difference signal generating means for generating second two color difference signals from the saturation signal and the hue signal so that a color image signal represented by the first luminance signal and the second two color difference signals has the same hue with the input three primary color signals and has degree of saturation corresponding to the saturation signal.

Further, the present invention provides a signal processing apparatus for processing input three primary color signals comprising: compression means for compressing signal level of portions of the input three primary color signals having signal level higher than a predetermined signal level with a predetermined compression ratio so as to generate compressed three primary color signals; luminance signal generating means for generating a luminance signal from the compressed three primary color signals; saturation signal generating means supplied with the compressed three primary color signals for generating a saturation signal indicating degree of saturation of the compressed three primary color signals; hue signal generating means supplied with the input three primary color signals for generating a hue signal indicating hue of the input three primary color signals; and color difference signal generating means for generating two color difference signals from the saturation signal and the hue signal so that a color image signal represented by the luminance signal and the two color difference signals has the same hue with the input three primary color signals and has degree of saturation corresponding to the saturation signal.

Furthermore, the present invention provides a signal processing apparatus for processing input three primary color signals comprising: compression means for compressing signal level of portions of each of the input three primary color signals having signal level higher than a predetermined signal level with a predetermined compression ratio so as to generate compressed three primary color signals; saturation signal generating means for generating a saturation signal indicating degree of saturation of the compressed three primary color signals; hue signal generating means for generating a hue signal indicating hue of the input three primary color signals; and color image signal generating means for generating a color image signal having the same hue with the input three primary color signals and having color information whose degree of saturation is lower than that of compressed three primary color signals from the saturation signal and the hue signal.

Moreover, the present invention provides a video camera for generating a color image signal comprising: image pickup means for generating first three primary color signals in response to a received light from images; compression means for compressing signal level of portions of the first three primary color signals having signal level higher than a predetermined signal level with a predetermined compression ratio; first matrix means for converting compressed three primary color signals supplied from said compression means into a first luminance signal and first two color difference signals; saturation signal generating means for generating a saturation signal indicating degree of saturation of the compressed three primary color signals from the first two color difference signals; hue signal generating means for generating a hue signal indicating hue of the first three primary color signals; and color difference signal generating means for generating second two color difference signals from the saturation signal and the hue signal so that a color image signal represented by the first luminance signal and the second two color difference signals has the same hue with the first three primary color signals and has degree of saturation corresponding to the saturation signal.

Further, the present invention provides a video camera for generating a color image signal comprising: image pickup means for generating first three primary color signals in response to a received light from images; compression means for compressing signal level of portions of the first three primary color signals having signal level higher than a predetermined signal level with a predetermined compression ratio so as to generate compressed three primary color signals; luminance signal generating means for generating a luminance signal from the compressed three primary color signals; saturation signal generating means supplied with the compressed three primary color signals for generating a saturation signal indicating degree of saturation of the compressed three primary color signals; hue signal generating means supplied with the first three primary color signals for generating a hue signal indicating hue of the first three primary color signals; and color difference signal generating means for generating two color difference signals from the saturation signal and the hue signal so that a color image signal represented by the luminance signal and the two color difference signals has the same hue with the first three primary color signals and has degree of saturation corresponding to the saturation signal.

Furthermore, the present invention provides a video camera for generating a color image signal comprising: image pickup means for generating first three primary color signals in response to a received light from images; compression means for compressing signal level of portions of each of the first three primary color signals having signal level higher than a predetermined signal level with a predetermined compression ratio so as to generate compressed three primary color signals; saturation signal generating means for generating a saturation signal indicating degree of saturation of the compressed three primary color signals; hue signal generating means for generating a hue signal indicating hue of the first three primary color signals; and color image signal generating means for generating a color image signal having the same hue with the first three primary color signals and having color information whose degree of saturation is lower than that of the compressed three primary color signals from the saturation signal and the hue signal.

Additional objects and advantages of the present invention will be apparent from the following detailed description of a preferred embodiment thereof, which is best understood with reference to the accompanying drawings.

DETAILED DESCRIPTION OF THE PREFERRED EMBODIMENT

Figure 1:
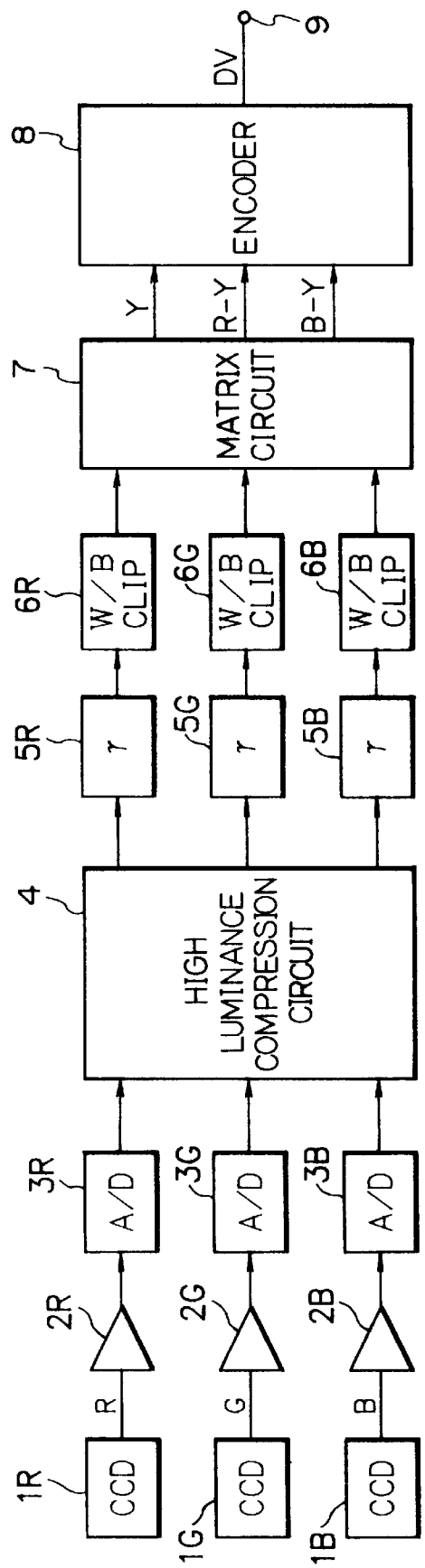
FIG. 1 is a block diagram showing a configuration of a video camera including a conventional high luminance compression apparatus.
Figure 2:
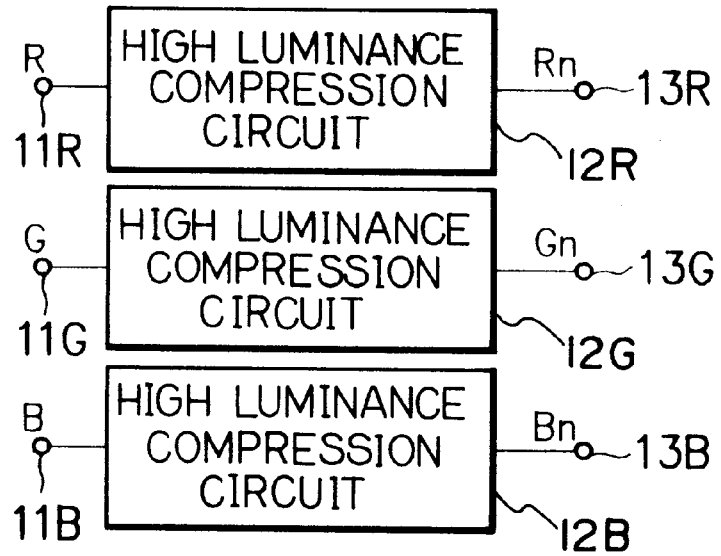
FIG. 2 is a block diagram showing a configuration of the conventional high luminance compression apparatus.
Figure 9:
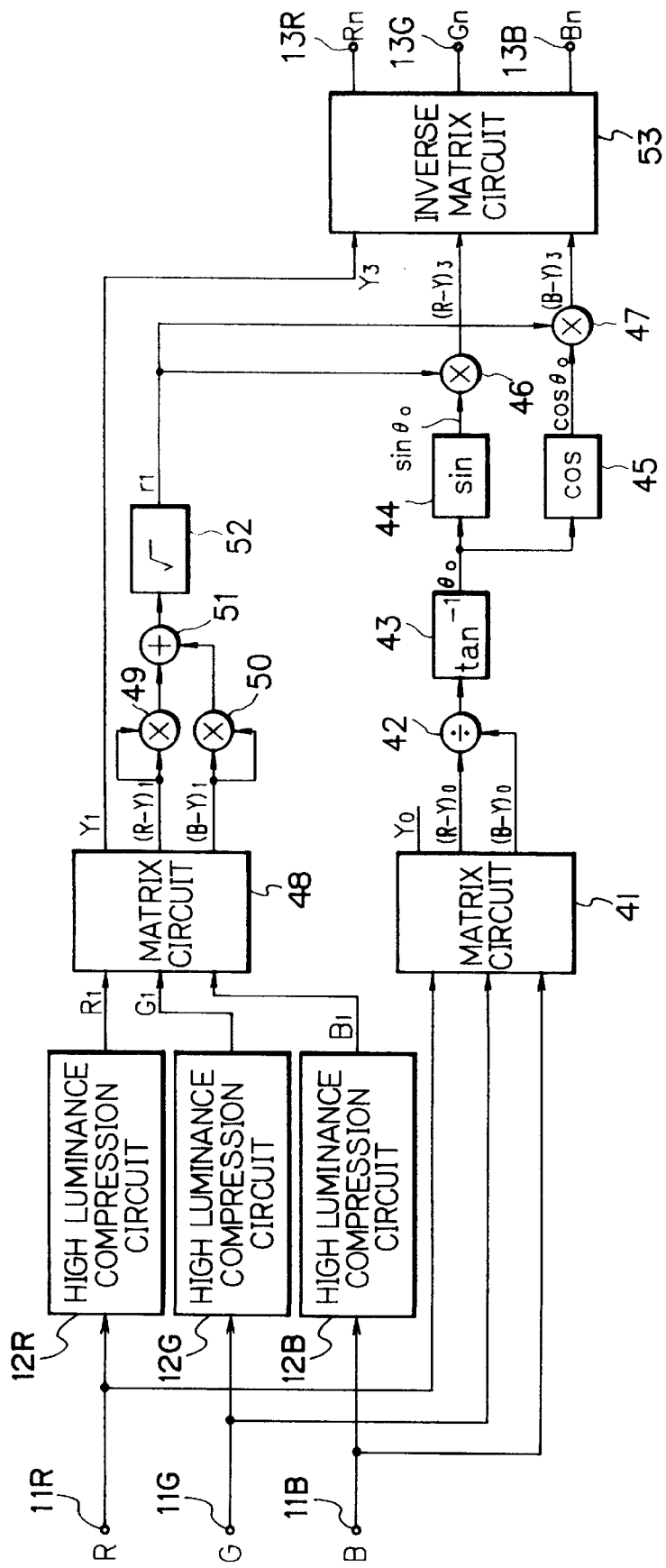
FIG. 9 is a block diagram showing a configuration of a signal processing apparatus according to an embodiment of the present invention.

Referring now to FIG. 9, one embodiment of the present invention will be described below. In FIG. 9, like reference numerals are used to designate like parts corresponding to FIGS. 2 and 6.

In FIG. 9, color signals R, G and B supplied to input terminals 11R, 11G and 11B are individually supplied to a matrix circuit 41. In the matrix circuit 41, a matrix operation as shown in the following determinant (1) is effected to obtain a luminance signal $Y_0$, a color difference signal $(R-Y)_0$, and a color difference signal $(B-Y)_0$.

$$\begin{bmatrix} Y_0 \\ (R-Y)_0 \\ (B-Y)_0 \end{bmatrix} = \begin{bmatrix} 0.30 & 0.59 & 0.11 \\ 0.70 & -0.59 & -0.11 \\ 0.30 & -0.59 & 0.89 \end{bmatrix} \begin{bmatrix} R \\ G \\ B \end{bmatrix} \quad (1)$$

Color difference signals $(R-Y)_0$ and $(B-Y)_0$ outputted from the matrix circuit 41 are supplied to a divider 42 to execute an operation of $(R-Y)_0/(B-Y)_0$. An output signal $(R-Y)_0/(B-Y)_0$ of the divider 42 is supplied to a look-up table 43 for obtaining an inverse tangent. In this case, an output signal from the look-up table 43 becomes $\tan^{-1}\{(R-Y)_0/(B-Y)_0\}$ and is indicative of a hue $\theta_0$ of a color represented by color signals R, G and B supplied to input terminals 11R, 11G and 11B.

The output signal $\tan^{-1}\{(R-Y)_0/(B-Y)_0\}$ from the look-up table 43 is supplied to each of look-up tables 44 and 45 to obtain a sine and a cosine. Then, output signals $\sin \theta_0$ and $\cos \theta_0$ from the look-up tables 44 and 45 are supplied to multipliers 46 and 47, respectively.

Figure 3:
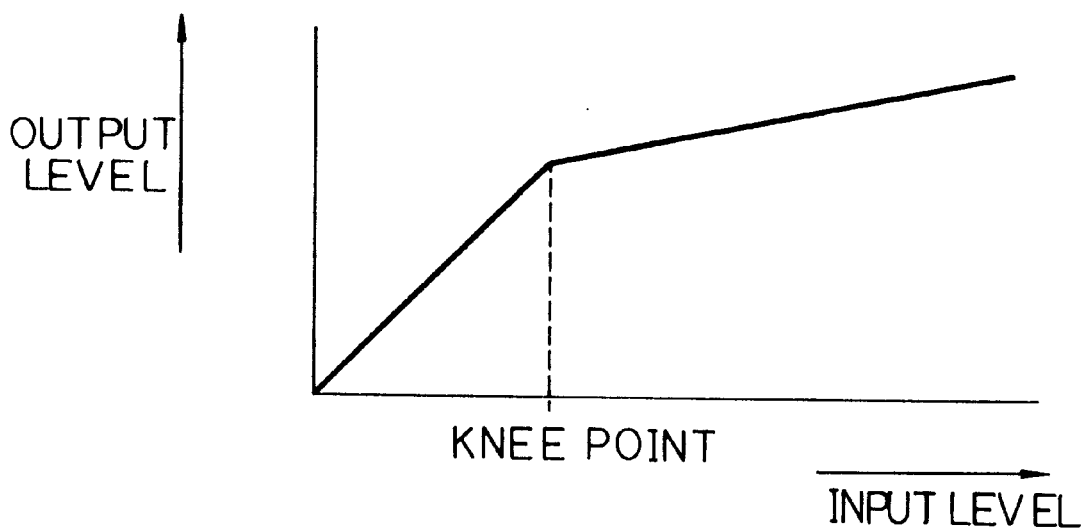
FIG. 3 is a graph showing input/output characteristics of conventional high luminance compression processing.
Figure 4:
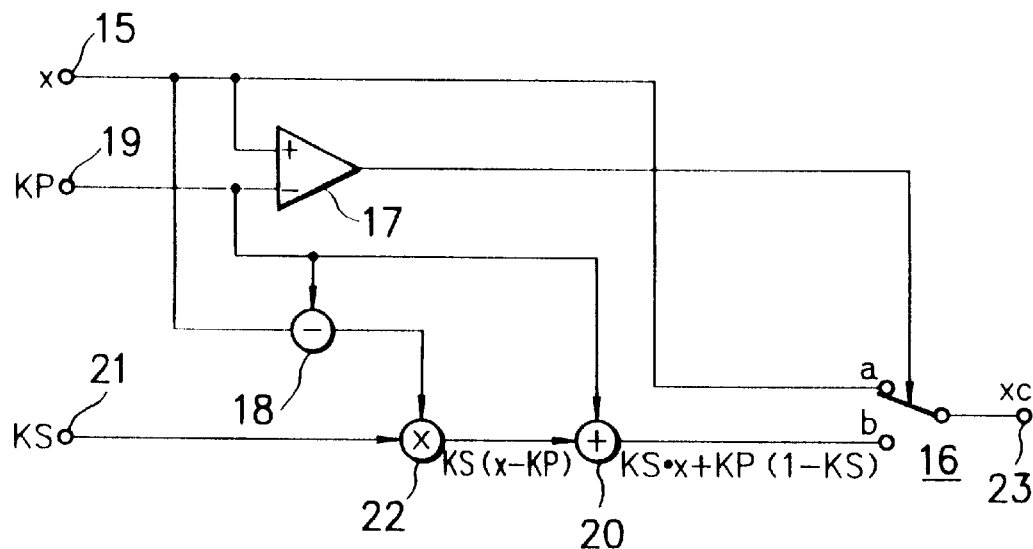
FIG. 4 is a block diagram showing a configuration of a conventional high luminance compression circuit.
Figure 5:
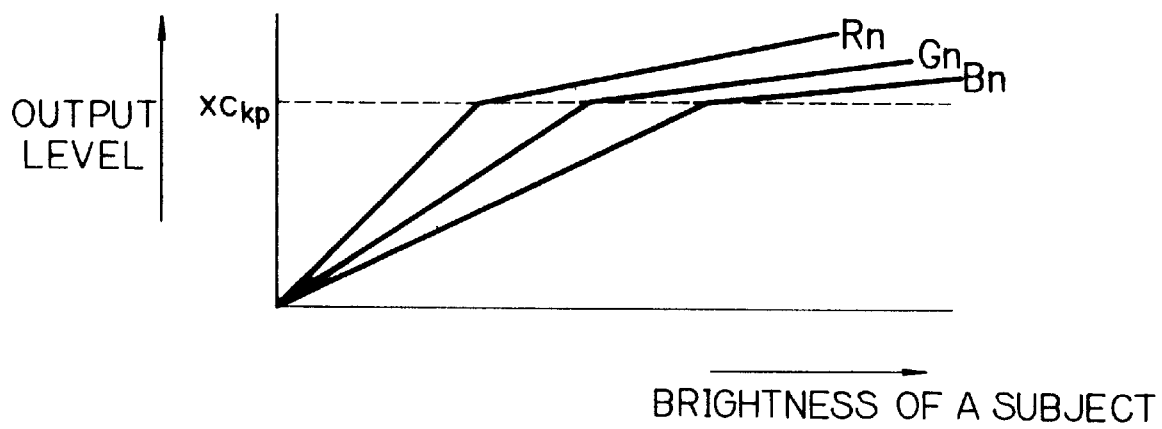
FIG. 5 is a graph showing a relationship between a brightness of subject and an output level of respective color signals in the high luminance compression apparatus shown in FIG. 2.

Moreover, color signals R, G and B supplied to input terminals 11R, 11G and 11B are supplied to high luminance compression circuits 12R, 12G and 12B, respectively. These high luminance compression circuits 12R, 12G and 12B are individually constructed as shown in FIG. 4 described above, and individually execute high luminance processing on the basis of the input/output characteristics shown in FIG. 3. Color signals $R_1$, $G_1$ and $B_1$ outputted from high luminance compression circuits 12R, 12G and 12B are supplied to a matrix circuit 48. In the matrix circuit 48, a matrix operation as shown in the following determinant (2) is executed to obtain a luminance signal $Y_1$, a color difference signal $(R-Y)_1$ and a color difference signal $(B-Y)_1$.

$$\begin{bmatrix} Y_1 \\ (R-Y)_1 \\ (B-Y)_1 \end{bmatrix} = \begin{bmatrix} 0.30 & 0.59 & 0.11 \\ 0.70 & -0.59 & -0.11 \\ 0.30 & -0.59 & 0.89 \end{bmatrix} \begin{bmatrix} R_1 \\ G_1 \\ B_1 \end{bmatrix} \quad (2)$$

Color difference signals $(R-Y)_1$ and $(B-Y)_1$ outputted from the matrix circuit 48 are individually squared by means of multipliers 49 and 50, and added together by means of an adder 51. Then, these signals are supplied to a look-up table 52 for obtaining a root square. In this case, an output signal from the look-up table 52 becomes $\sqrt{(R-Y)_1^2 + (B-Y)_1^2}$, and is indicative of a degree of saturation $r_1$ of a color represented by color signals $R_1$, $G_1$ and $B_1$ outputted from the respective high luminance compression circuits 12R, 12G and 12B. The output signal $\sqrt{(R-Y)_1^2 + (B-Y)_1^2}$ from the look-up table 52, that is, $r_1$ is supplied to each of multipliers 46 and 47.

In the multiplier 46, the output signal $\sin \theta_0$ from the look-up table 44 and the output signal $r_1$ from the look-up table 52 are multiplied. Thus, an output signal of the multiplier 46 becomes $\sqrt{(R-Y)_1^2 + (B-Y)_1^2} \cdot \sin [\tan^{-1}\{(R-Y)_0/(B-Y)_0\}] = r_1 \sin \theta_0$, and is indicative of a color difference signal $(R-Y)_3$ for representing a color which has the same hue as the hue $\theta_0$ of color represented by color signals R, G and B supplied to input terminals 11R, 11G and 11B, and a degree of saturation same with the degree of saturation $r_1$ f color represented by color signals $R_1$, $G_1$ and $B_1$ outputted from the respective high luminance compression circuits 12R, 12G and 12B.

On the other hand, an output signal from the multiplier 47 becomes $\sqrt{(R-Y)_1^2 + (B-Y)_1^2} \cdot \cos[\tan^{-1}\{(R-Y)_0/(B-Y)_0\}] = r_1 \cos \theta_0$, and is indicative of a color difference signal $(B-Y)_3$ for representing a color which has the same hue as the hue $\theta_0$ of color represented by color signals R, G and B supplied to input terminals 11R, 11G and 11B, and the same saturation as the saturation $r_1$ of color represented by color signals $R_1$, $G_1$ and $B_1$ outputted from the respective high luminance compression circuits 12R, 12G and 12B.

Color difference signals $(R-Y)_3$ and $(B-Y)_3$ outputted from the multipliers 46 and 47 are supplied to an inverse matrix circuit 53. Moreover, the luminance signal $Y_1$ outputted from the matrix circuit 48 is supplied to the inverse matrix circuit 53 as a luminance signal $Y_3$. In the inverse matrix circuit 53, an inverse matrix operation as the following determinant (3) is effected to obtain color signals Rn, Gn and Bn subjected to high luminance compression processing. These color signals thus obtained are led through respective output terminals 13R, 13G and 13B.

$$\begin{bmatrix} Rn \\ Gn \\ Bn \end{bmatrix} = \begin{bmatrix} 1 & 1 & 0 \\ 1 & -30/59 & -11/59 \\ 1 & 0 & 1 \end{bmatrix} \begin{bmatrix} Y_3 \\ (R-Y)_3 \\ (B-Y)_3 \end{bmatrix} \quad (3)$$

In this embodiment, color difference signals $(R-Y)_3$ and $(B-Y)_3$ are supplied to the inverse matrix circuit 53. These color difference signals are used for representing a color which has the same as the hue $\theta_0$ of color represented by color signals R, G and B supplied to input terminals 11R, 11G and 11B, and has the same saturation as the degree of saturation $r_1$ of color represented by color signals $R_1$, $G_1$ and $B_1$ outputted from the respective high luminance compression circuits 12R, 12G and 12B. And then, the inverse matrix circuit 53 performs an inverse matrix operation. Therefore, a color, which is obtained from output terminals 13R, 13G and 13B and represented by color signals Rn, Gn and Bn, has the same hue as the hue $\theta_0$ of color represented by color signals R, G and B, and the same saturation as the degree of saturation $r_1$ of color represented by color signals $R_1$, $G_1$ and $B_1$. Thus, even though the above color signal is compressed, the signal processing apparatus of the present invention not only has no change in a hue like the apparatus shown in FIG. 6, but also can make small a degree of saturation as compared with the apparatus shown in FIG. 6 in the case where the signal is compressed. Accordingly, a pictorial image does not become unnatural even if a color in a high luminance portion is too dense; as a consequence, natural color reproduction can be provided.

Figure 6:
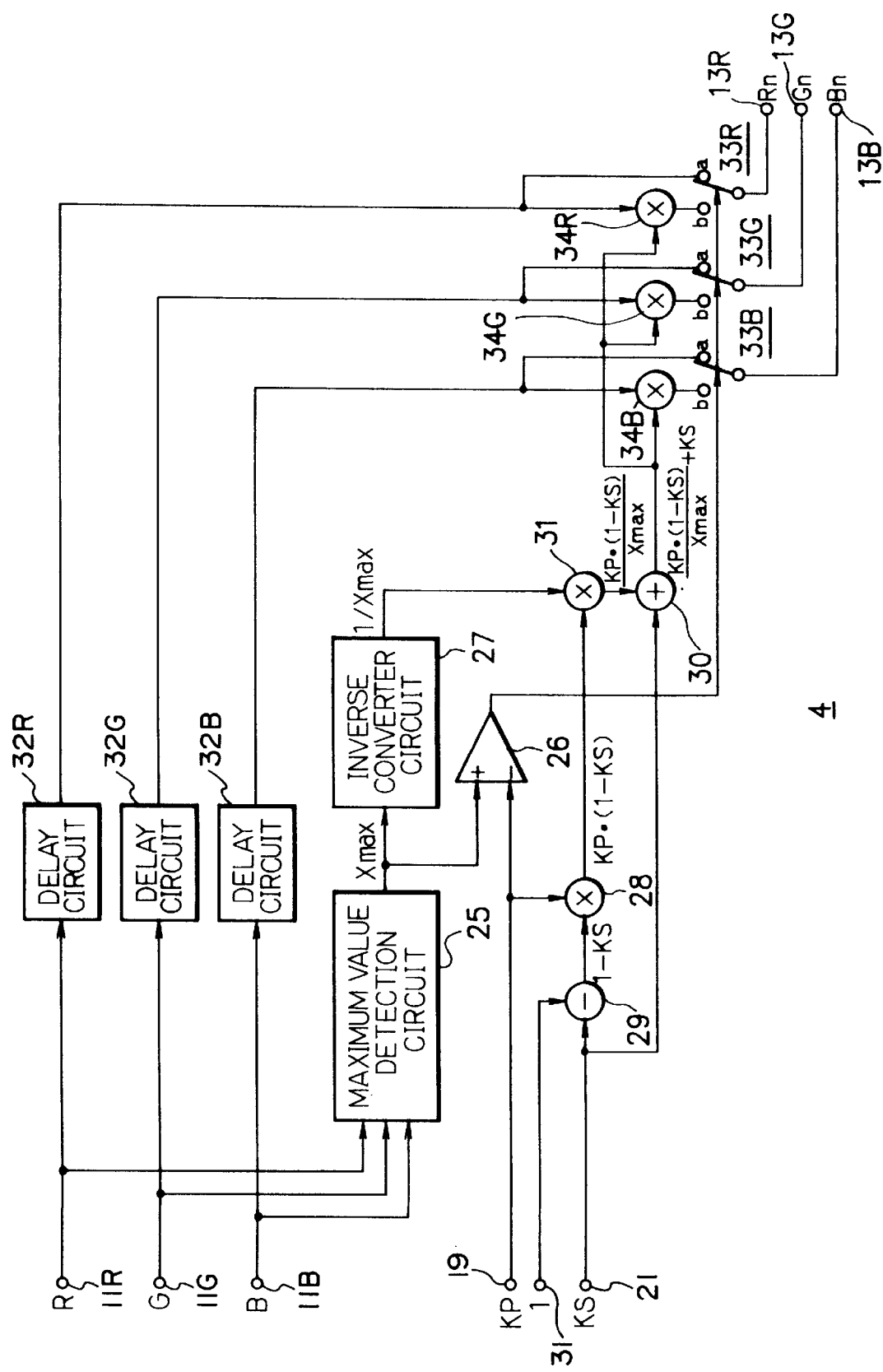
FIG. 6 is a block diagram showing a configuration of a high luminance compression apparatus proposed by the applicant of the present application.
Figure 7:
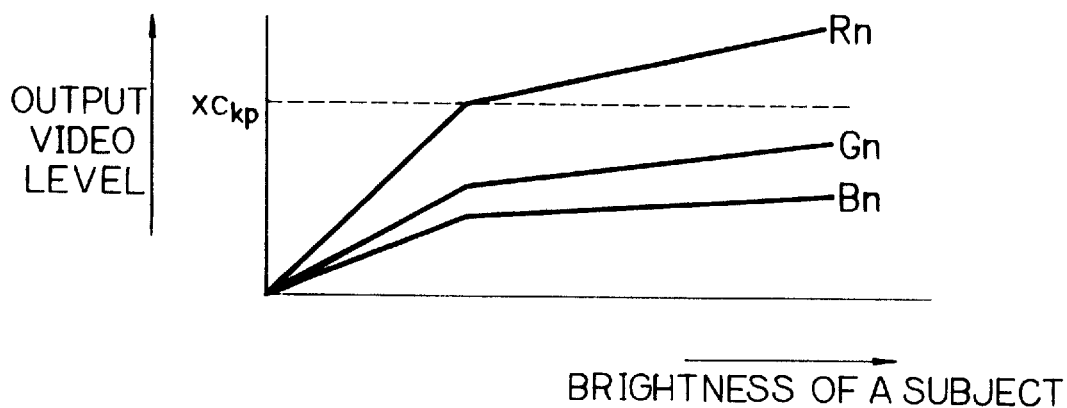
FIG. 7 is a graph showing a relationship between a brightness of a subject and an output level of respective color signals in the high luminance compression apparatus shown in FIG. 6.
Figure 8:
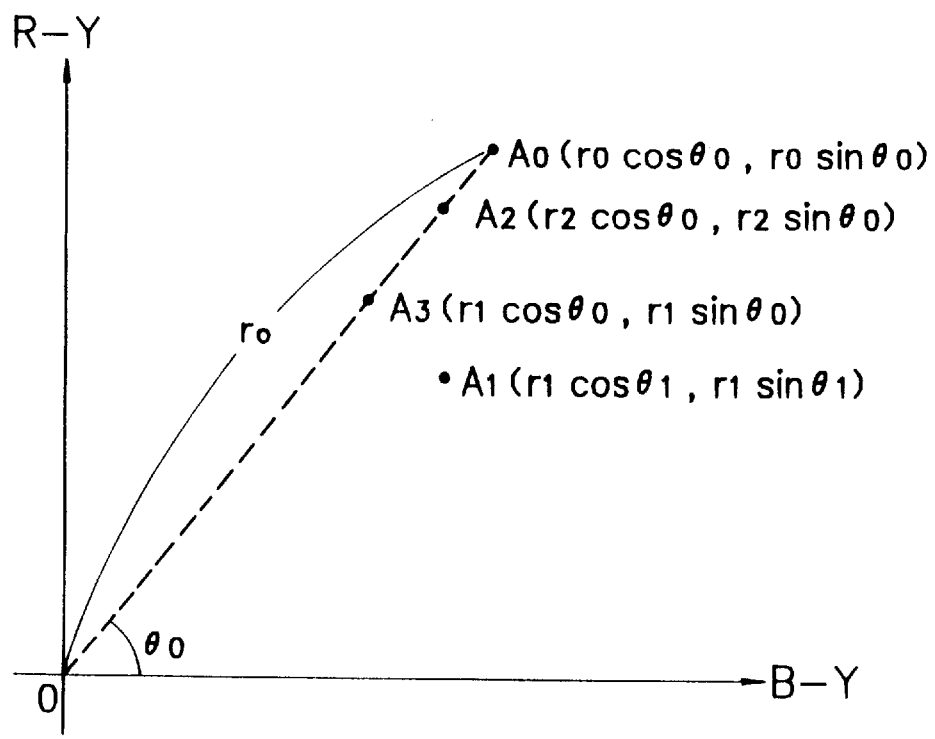
FIG. 8 is a view showing a color difference coordinate plane on which a color represented by respective color signals is shown.

Next, with reference to the color difference coordinate pale shown in FIG. 8, the reason why a degree of saturation becomes small as compared with that of the apparatus of FIG. 6 in compression processing will be described below. Specifically, if a color represented by color signals R, G and B supplied to input terminals 11R, 11G and 11B is shown at a point $A_0$ ($r_0\cos\theta_0$, $r_0\sin\theta_0$) on the coordinate plane, and a color represented by color signals $R_1$, $G_1$ and $B_1$ obtained from high luminance compression circuits 12R 12G and 12B when a video level of a certain color signal exceeds the knee point and is compressed, is shown at a point $A_1$ ($r_1\cos\theta_1$, $r_1\sin\theta_1$) on the coordinate plane, a color represented by color signals Rn, Gn and Bn obtained from output terminals 13R, 13G and 13B is shown at a point $A_3$ ($r_1\cos\theta_0$, $r_1\sin\theta_0$) on the coordinate plane. This point on the coordinate means that a hue $\theta_0$ has no change and the degree of saturation $r_1$ becomes small as compared with the degree of saturation $r_2$ of the color represented by color signals Rn, Gn and Bn obtained from the apparatus of FIG. 6. Incidentally, in the coordinate, symbols $r_0$ to $r_3$ show a degree of saturation, and $\theta_0$ and $\theta_1$ shows an angle from the B-Y axis, that is, a hue.

Figure 10:
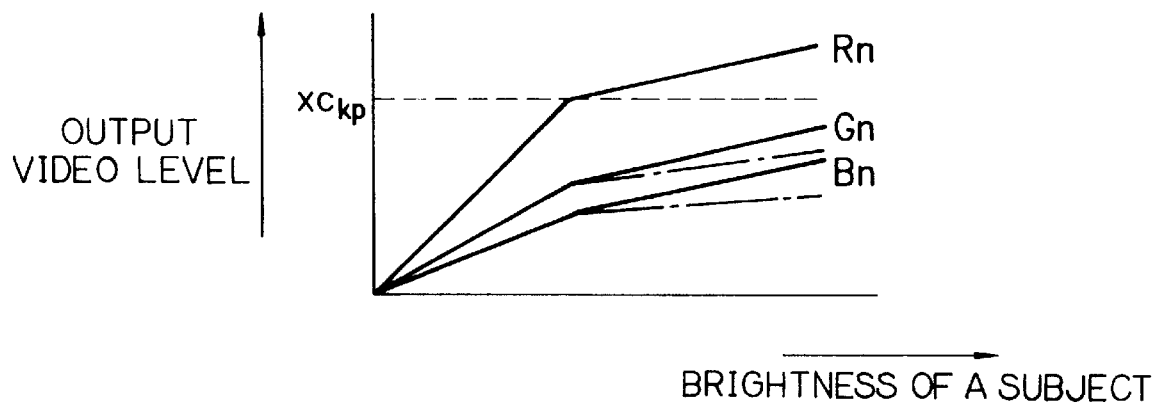
FIG. 10 is a graph showing a relationship between a brightness of a subject and an output level of respective color signals in the present invention.

Moreover, in the present embodiment, color signals Rn, Gn and Bn are variable as shown in the graph of FIG. 10 in accordance with a change in the brightness of subject. A dotted chain line shown in FIG. 10 shows color signals Rn, Gn and Bn obtained from the apparatus of FIG. 6 to make a comparison between the apparatus of the present invention and the conventional apparatus. In this case, a change of the color signal Rn having the maximum video level is the same as that of the color signal Rn obtained from the apparatus of FIG. 6.

Also, in the aforesaid embodiment, an operation processing is effected so that the degree of saturation of the color represented by color signals Rn, Gn and Bn obtained from output terminals 13R, 13G and 13G and compressed, becomes the same as the degree of saturation $r_1$ of the color represented by color signals $R_1$, $G_1$ and $B_1$ outputted from high luminance compression circuits 12R, 12G and 12G. In this case, if the operation processing is effected so that the degree of saturation at least becomes smaller than the degree of saturation $r_2$ of the color represented by color signals Rn, Gn and Bn obtained from the apparatus of FIG. 6, an effect like the aforesaid embodiment can be obtained. Moreover, in the apparatus shown in FIG. 9, the degree of saturation of the color represented by color signals Rn, Gn and Bn obtained from output terminals 13R, 13G and 13G, can be arbitrarily adjusted by multiplying an output signal $r_1$ from the look-up table 42 by a coefficient. In addition, in the aforesaid embodiment, high luminance compression processing is performed in hardware. Off course, it comes true in software, likewise.

According to the present invention, in order to obtain output three primary color signals, operation processing is effected so that three primary color signals individually subjected to high luminance compression processing represent a color which has the same hue as the hue of color represented by input three primary color signals and a degree of saturation smaller than the saturation of color represented three primary color signals obtained by compressing the input three primary color signals with the same compression ratio. Thus, not only there is no change in a hue even if these signals are compressed, but also it is possible to make small a degree of saturation in the compression processing. Accordingly, a pictorial image does not become unnatural even if a high luminance portion is too deeply colored; as a consequence, natural color reproduction can be provided.

It will be obvious to those having skill in the art that many changes may be made in the above-described details of the preferred embodiment of the present invention. The scope of the present invention, therefore, should be determined by the following claims.

What is claimed is:

1. A signal processing apparatus for processing input three primary color signals comprising:

compression means for compressing signal level of portions of the input three primary color signals having signal level higher than a predetermined signal level with a predetermined compression ratio;

first matrix means for converting compressed three primary color signals supplied from said compression means into a first luminance signal and first two color difference signals;

saturation signal generating means for generating a saturation signal indicating degree of saturation of the compressed three primary color signals from the first two color difference signals;

hue signal generating means for generating a hue signal indicating hue of the input three primary color signals; and color difference signal generating means for generating second two color difference signals from the saturation signal and the hue signal so that a color image signal represented by the first luminance signal and the second two color difference signals has the same hue with the input three primary color signals and has degree of saturation corresponding to the saturation signal.

2. The signal processing apparatus according to claim 1, further comprising second matrix means for generating output three primary color signals from the first luminance signal and the second two color difference signals.

3. A signal processing apparatus for processing input three primary color signals comprising:

compression means for compressing signal level of portions of the input three primary color signals having signal level higher than a predetermined signal level with a predetermined compression ratio so as to generate compressed three primary color signals;

luminance signal generating means for generating a luminance signal from the compressed three primary color signals;

saturation signal generating means supplied with the compressed three primary color signals for generating a saturation signal indicating degree of saturation of the compressed three primary color signals;

hue signal generating means supplied with the input three primary color signals for generating a hue signal indicating hue of the input three primary color signals; and color difference signal generating means for generating two color difference signals from the saturation signal and the hue signal so that a color image signal represented by the luminance signal and the two color difference signals has the same hue with the input three primary color signals and has degree of saturation corresponding to the saturation signal.

4. A signal processing apparatus for processing input three primary color signals comprising:

compression means for compressing signal level of portions of each of the input three primary color signals having signal level higher than a predetermined signal level with a predetermined compression ratio so as to generate compressed three primary color signals;

saturation signal generating means for generating a saturation signal indicating degree of saturation of the compressed three primary color signals;

hue signal generating means for generating a hue signal indicating hue of the input three primary color signals; and color image signal generating means for generating a color image signal having the same hue with the input three primary color signals and having color information whose degree of saturation is lower than that of compressed three primary color signals from the saturation signal and the hue signal.

5. The signal processing apparatus according to claim 4, wherein degree of saturation of the color image signal is same as that of the compressed three primary color signals.

6. A video camera for generating a color image signal comprising:

image pickup means for generating first three primary color signals in response to a received light from images;

compression means for compressing signal level of portions of the first three primary color signals having signal level higher than a predetermined signal level with a predetermined compression ratio;

first matrix means for converting compressed three primary color signals supplied from said compression means into a first luminance signal and first two color difference signals;

saturation signal generating means for generating a saturation signal indicating degree of saturation of the compressed three primary color signals from the first two color difference signals;

hue signal generating means for generating a hue signal indicating hue of the first three primary color signals; and color difference signal generating means for generating second two color difference signals from the saturation signal and the hue signal so that the color image signal represented by the first luminance signal and the second two color difference signals has the same hue with the first three primary color signals and has degree of saturation corresponding to the saturation signal.

7. The video camera according to claim 6, further comprising second matrix means for generating second three primary color signals from the first luminance signal and the second two color difference signals.

8. A video camera for generating a color image signal comprising:

image pickup means for generating first three primary color signals in response to a received light from images;

compression means for compressing signal level of portions of the first three primary color signals having signal level higher than a predetermined signal level with a predetermined compression ratio so as to generate compressed three primary color signals;

luminance signal generating means for generating a luminance signal from the compressed three primary color signals;

saturation signal generating means supplied with the compressed three primary color signals for generating a saturation signal indicating degree of saturation of the compressed three primary color signals;

hue signal generating means supplied with the first three primary color signals for generating a hue signal indicating hue of the first three primary color signals; and color difference signal generating means for generating two color difference signals from the saturation signal and the hue signal so that the color image signal represented by the luminance signal and the two color difference signals has the same hue with the first three primary color signals and has degree of saturation corresponding to the saturation signal.

9. A video camera for generating a color image signal comprising:

image pickup means for generating first three primary color signals in response to a received light from images;

compression means for compressing signal level of portions of each of the first three primary color signals having signal level higher than a predetermined signal level with a predetermined compression ratio so as to generate compressed three primary color signals;

saturation signal generating means for generating a saturation signal indicating degree of saturation of the compressed three primary color signals;

hue signal generating means for generating a hue signal indicating hue of the first three primary color signals; and color image signal generating means for generating the color image signal having the same hue with the first three primary color signals and having color information whose degree of saturation is lower than that of the compressed three primary color signals from the saturation signal and the hue signal.

10. The video camera according to claim 9 wherein degree of saturation of the color image signal is the same as that of the compressed three primary color signals.

* * * * *